United States Patent
Makuta

(10) Patent No.: US 7,079,851 B2
(45) Date of Patent: Jul. 18, 2006

(54) CONTROL METHOD FOR INFORMATION NETWORK SYSTEM, INFORMATION NETWORK SYSTEM AND MOBILE COMMUNICATION TERMINAL

(75) Inventor: Yoshihisa Makuta, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 257 days.

(21) Appl. No.: 10/613,055

(22) Filed: Jul. 2, 2003

(65) Prior Publication Data
US 2004/0009778 A1    Jan. 15, 2004

(30) Foreign Application Priority Data
Jul. 15, 2002 (JP) ............... 2002-205072

(51) Int. Cl.
H04Q 7/20 (2006.01)
(52) U.S. Cl. ............... 455/456.3; 455/414.2; 455/422.1; 455/456.1; 455/456.2; 455/457
(58) Field of Classification Search ............ 455/456.3, 455/414.2, 411, 404.2, 440, 456.1–457; 342/450, 342/357.06; 701/213; 340/359.13
See application file for complete search history.

(56) References Cited

U.S. PATENT DOCUMENTS

| | | | | |
|---|---|---|---|---|
| 5,778,304 A * | 7/1998 | Grube et al. | ............ | 455/456.4 |
| 6,177,905 B1 * | 1/2001 | Welch | ............ | 342/357.13 |
| 6,512,922 B1 * | 1/2003 | Burg et al. | ............ | 455/432.1 |
| 6,625,455 B1 * | 9/2003 | Ariga | ............ | 455/456.1 |
| 6,832,093 B1 * | 12/2004 | Ranta | ............ | 455/456.4 |
| 2001/0018349 A1 * | 8/2001 | Kinnunen et al. | ............ | 455/456 |
| 2002/0077060 A1 * | 6/2002 | Lehikoinen et al. | ............ | 455/41 |
| 2002/0090953 A1 * | 7/2002 | Aburai et al. | ............ | 455/456 |
| 2002/0137523 A1 * | 9/2002 | Diggelen | ............ | 455/456 |
| 2003/0040314 A1 * | 2/2003 | Hogan et al. | ............ | 455/435 |
| 2004/0058693 A1 * | 3/2004 | Mardirossian | ............ | 455/458 |
| 2004/0198396 A1 * | 10/2004 | Fransioli | ............ | 455/456.3 |
| 2004/0203862 A1 * | 10/2004 | Wood et al. | ............ | 455/456.1 |

FOREIGN PATENT DOCUMENTS

JP    2000-215169    8/2000

* cited by examiner

Primary Examiner—Eliseo Ramos-Feliciano
Assistant Examiner—Dai Phuong
(74) Attorney, Agent, or Firm—Townsend and Townsend and Crew LLP

(57) ABSTRACT

The present invention is directed to the prevention of invalid access and inappropriate information transfer by limiting the accessible range to the information resource on a radio network. In one embodiment, a method of providing access to an information unit by a wireless unit comprises providing a first position information containing an access enabled area for the wireless unit, wherein the access enabled area falls within a range of communicable area of a wireless access point; and obtaining a second position information containing a current position of the wireless unit. If the current position of the wireless unit is within the access enabled area for the wireless unit, access if permitting to the information unit by the wireless unit. If the current position of the wireless unit is outside the access enabled area for the wireless unit, access to the information unit is denied by the wireless unit even if the current position of the wireless unit is within the range of communicable area of the access point.

19 Claims, 7 Drawing Sheets

FIG.2

| RADIO LAN AP 600a | ACCESS ENABLED AREA 600b | RECEPTION ENABLED RANGE 600c | | ACCESS DESTINATION TERMINAL LIST 600d | ACCESS ORIGINATION TERMINAL LIST 600e |
|---|---|---|---|---|---|
| | | X | Y | | |
| 101 | 211 | 10-12 | 32-34 | 411 | 311 |
| 101 | 212 | 12-14 | 30-32 | 412 | 312 |
| 101 | 213 | 13-15 | 33-35 | 413,300 | 313,314 |
| 102 | 214 | 14-16 | 27-29 | 312,301 | 315 |

600

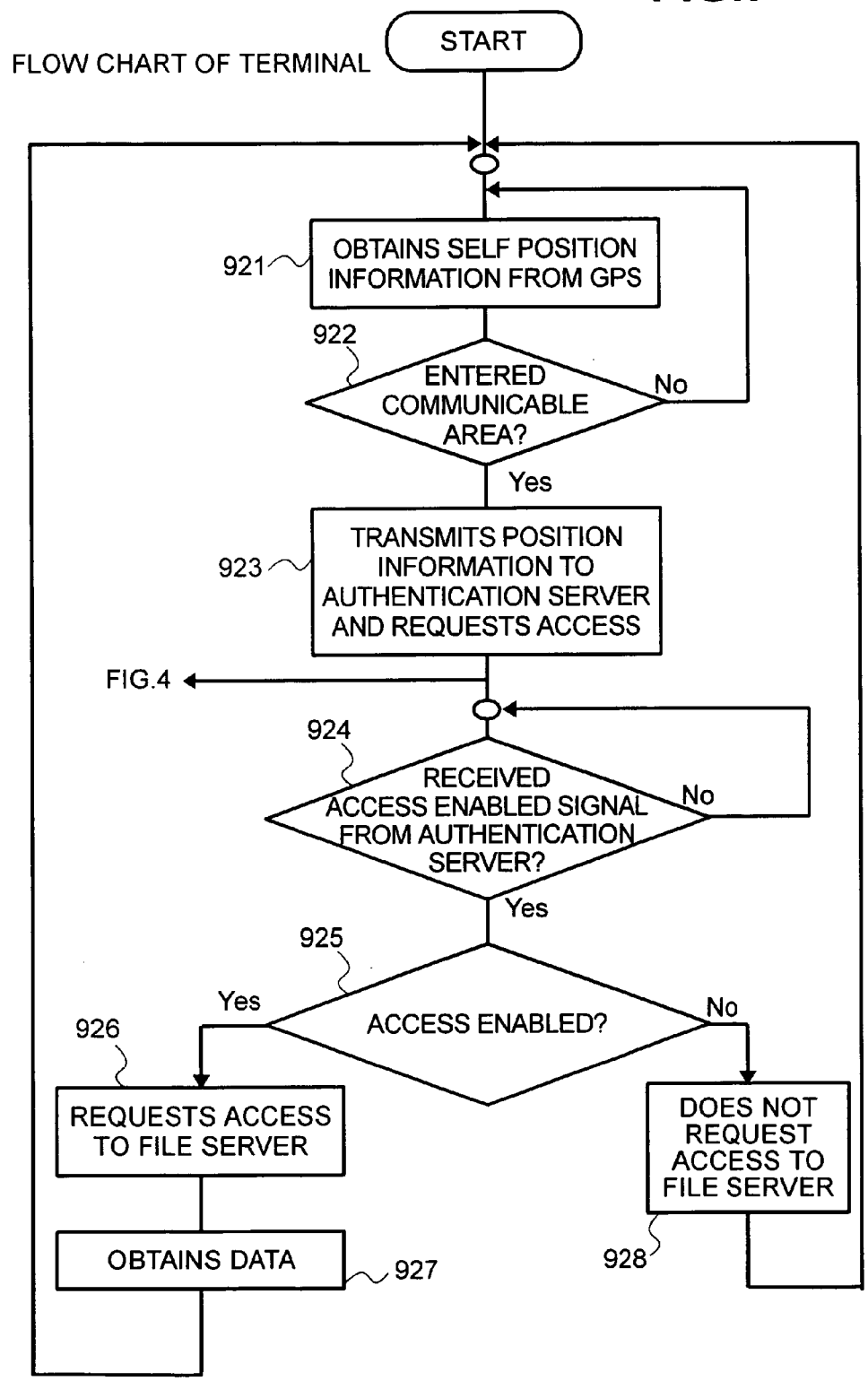

CONTROL METHOD FOR INFORMATION NETWORK SYSTEM, INFORMATION NETWORK SYSTEM AND MOBILE COMMUNICATION TERMINAL

CROSS-REFERENCES TO RELATED APPLICATIONS

This application relates to and claims priority from Japanese Patent Application No. 2002-205072, filed on Jul. 15, 2002, the entire disclosure of which is incorporated herein by reference.

BACKGROUND OF THE INVENTION

1. Field of the Invention

The present invention relates to an information network technology and a mobile communication terminal, and more particularly to an authentication technology for an authentication server performing shared control of a file based on the position information of each terminal and file server, in an environment where a plurality of terminals and file servers which have a sharable information resource, such as a file, are connected to be a network via cable or radio transmission.

2. Description of the Related Art

Terminals and file servers are connected via a network to share information. In a radio network connection, the terminals and file servers can establish communication via access points of a radio LAN using radio waves.

However, the radio waves reaching range is undefined, so it is possible that an unexpected terminal which exists in the radio waves reaching range connects to the network, and a user with ill intent may operate the terminal and obtain information from another terminal or file server without leaving any evidence of their presence.

In the above mentioned prior art, where the range in which the radio communication is possible is not restricted, the case when an unexpected or unauthorized terminal which exists in the radio waves reaching range is connected to the network is not considered, and a leak of information may occur, which has been a technical problem.

Japanese Patent Laid-Open No. 2000-215169 discloses a technology where a specified data set is assigned for each access point to the LAN of the radio terminal, so that the specified data set is accessed automatically each time an access point changes, but the position information used for identifying the position of this radio terminal is only the position information of the access point. Therefore it is possible, for example, that an access point is assigned to each room of a building and an accessible data set can be switched each time the user moves out of each room, but access from outside the building cannot be identified, where the above mentioned technical problem, such as information leakage, is still unresolved.

SUMMARY OF THE INVENTION

The present invention is directed to a control method for an information network system which is comprised of a cable or radio information network and a plurality of information processing units connected thereto, wherein accessibility to an information resource on the information network of the information processing unit is controlled using the first position information on the connection position of each one of the information processing units with respect to the information network and the second position information to indicate the current position of the information processing unit.

More specifically, for example, the current position information (second position information) of the terminal and file server which are network-connected via cable or radio is obtained, the respective communicable range is set at the authentication server based on the respective current position information of the terminal and file server and position information (first position information) of the access point (network segment), and information is transmitted/received from/to a terminal and server in the restricted range respectively.

In the above configuration, the position information of the terminal and file server is obtained based on the information determined from the distance between the terminal or file server itself and a plurality of GPS satellites. Alternatively, the position information of the terminal and file server is obtained based on the information obtained from the distance between the terminal or file server itself and a plurality of portable telephone base stations. In other embodiments, the position information of the terminal and file server is obtained based on the position information of the terminal or file server itself and the radio LAN access point to which the terminal and file server can be connected.

In the above configuration, the authentication server decides the communicable range of each terminal and file server, and controls the communication range using the position information received from each terminal and file server.

The terminal or file server can fetch a file from another terminal or file server via the authentication server.

When an access request to a terminal is out of the communicable range of a terminal, the authentication server performs access control not to approve access to the terminal.

It is a feature of the present invention to restrict the range in which communication is possible so that network connection from an unexpected terminal is rejected, and to provide a network connection environment only in a restricted range so that accurate information transfer, free from information leakage and a disguised user, is enabled.

It is another feature of the present invention for each terminal and file server to obtain respective position information from the distance between each terminal or file server and a plurality of GPS satellites or a plurality of portable telephone base stations.

It is still another feature of the present invention to determine the communicable range of each terminal and file server, and control the communication range at an authentication server using the position information received from each terminal and file server.

In one embodiment, a method of providing access to an information unit by a wireless unit comprises providing a first position information containing an access enabled area for the wireless unit, wherein the access enabled area falls within a range of communicable area of a wireless access point; and obtaining a second position information containing a current position of the wireless unit. If the current position of the wireless unit is within the access enabled area for the wireless unit, access if permitting to the information unit by the wireless unit. If the current position of the wireless unit is outside the access enabled area for the wireless unit, access to the information unit is denied by the wireless unit even if the current position of the wireless unit is within the range of communicable area of the access point.

In another embodiment, a system for providing access to an information unit by a wireless unit comprises a memory including a first position information containing an access enabled area for the wireless unit, wherein the access enabled area falls within a range of communicable area of a wireless access point. A position module is configured to obtain a second position information containing a current position of the wireless unit. An access module is configured, if the current position of the wireless unit is within the access enabled area for the wireless unit, to permit access to the information unit by the wireless unit, and, if the current position of the wireless unit is outside the access enabled area for the wireless unit, to deny access to the information unit by the wireless unit even if the current position of the wireless unit is within the range of communicable area of the access point.

BRIEF DESCRIPTION OF THE DRAWINGS

FIG. 2 is a simplified schematic diagram depicting an example of the information table which is used in the control method for the information network system according to an embodiment of the present invention;

FIG. 7 is a flow chart depicting an example of the operation of the terminal in the information network system according to an embodiment of the present invention.

DESCRIPTION OF THE PREFERRED EMBODIMENTS

Embodiments of the present invention will now be described in detail with reference to the accompanying drawings.

Figure 1:
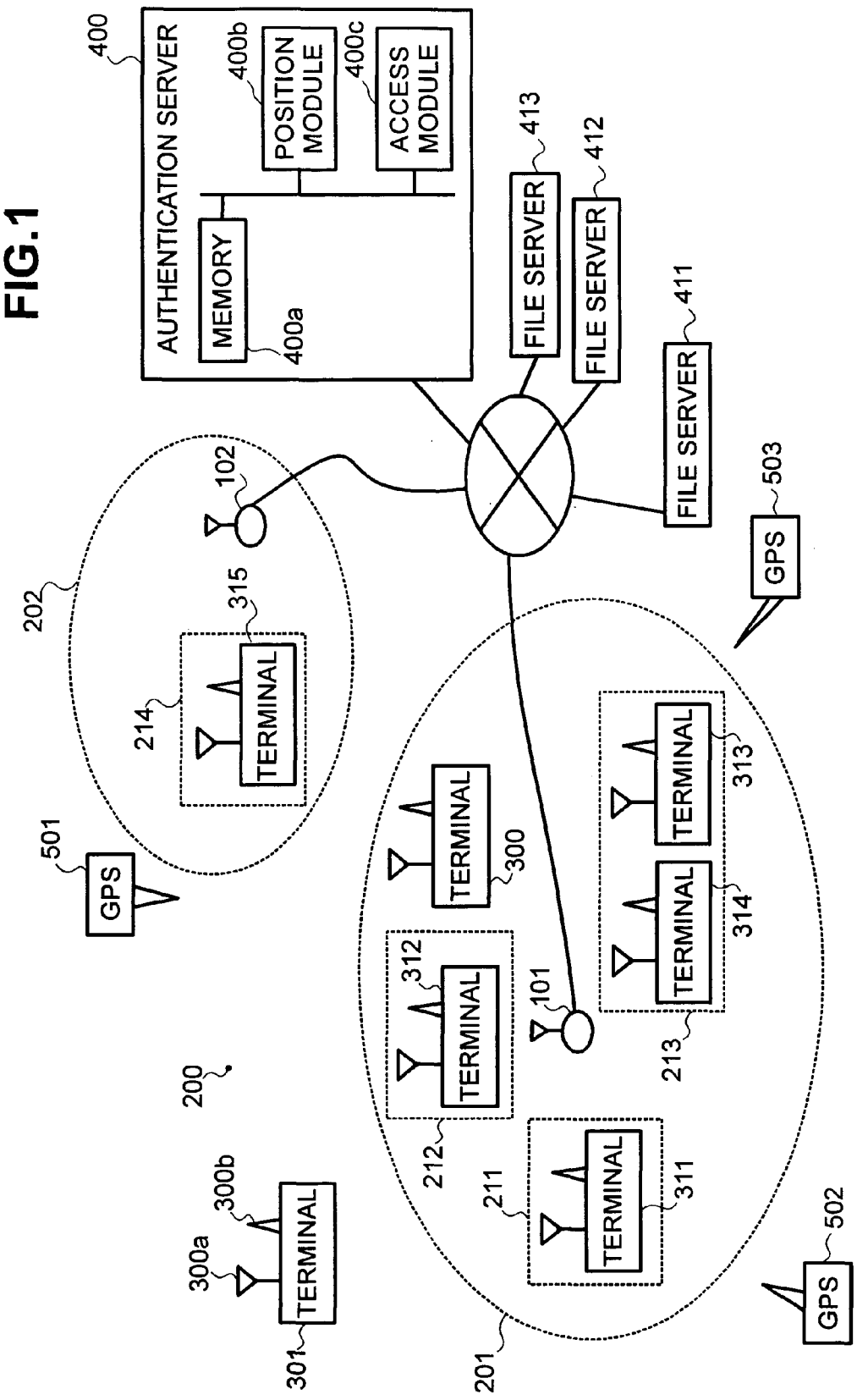
FIG. 1 is a simplified schematic diagram depicting an example of the configuration of the information network system for embodying the control method for the information network system according to an embodiment of the present invention.

FIG. 1 is a simplified schematic diagram depicting an example of the configuration of the information network for embodying the control method for the information network system according to an embodiment of the present invention.

In the present embodiment, the information network will be described using a network system where each terminal obtains position information by GPS (Global Positioning System) respectively and decides which terminals are shared at the authentication server as an example.

As FIG. 1 shows, the network system of the present embodiment is comprised of a plurality of wireless units or terminals 300, 301, 311–315 (hereafter generalized as terminal 3xx) each of which has a sharable file and can freely move, file servers 411–413 (hereafter generalized as 41x) each of which has a sharable file and is fixed at a specified position, authentication server 400 which collects position information of the terminal 3xx, decides the accessible range of each terminal and controls access, radio LAN access point 101 which is installed for connecting each terminal 3xx to the authentication server 400, and a plurality of GPS satellites 501, 502, 503 (hereafter generalized as 50x) which are used for obtaining position information of the terminal 3xx.

Each one of the terminals 3xx has a radio LAN access function 300a for performing radio communication with the radio LAN access point, GPS reception function 300b for obtaining current position information of the terminal 3xx in communication with the GPS satellite 50x, and a function to send this current position information to the radio LAN. Each one of the file servers 41x can also have a function to obtain position information of itself and send it to the authentication server 400.

The authentication server 400 includes a memory 400a which stores a first position information containing an access enabled area for a terminal, a position module 400b which receives from the terminal a second position information containing the current position of the terminal, and an access module 400c which controls access to the information units such as file servers by the terminal according to the method described herein below.

When the terminal 3xx includes a portable telephone function, a function to obtain the current position from the positional relationship with the base station, which is not illustrated, in a public portable telephone network, is installed as the GPS reception function 300b.

FIG. 2 is a simplified schematic diagram depicting an example of a configuration of the information table to be used for authentication processing for controlling the approval of access of a terminal or a file server which has a sharable file to a terminal depending on the area.

In the information table 600 of the present embodiment, access enabled area 600b, reception enabled range 600c represented by the enabled range (x, y) coordinates, access destination terminal list 600d, and access origination terminal list 600e are stored and associated with each one of the radio LAN access points 600a. The reference characters of the radio LAN access point 600a, access enabled area 600b, access destination terminal list 600d, and access origination terminal list 600e correspond to the reference characters of the various elements and components in FIG. 1.

For the numeric values of the enabled range (x, y) coordinates of the reception enabled range 600c, simple numeric values are set to simplify the description; however in reality the reference values of authentication based on the current position (longitude, latitude, etc.) of each terminal, for example, are set.

Referring to the example in the first row 601 of the information table 600, the file server 411, which has a sharable file, wherein an area 211 is set as an accessible area, is stored in the information table 600. The terminal 311 in the area 211 can communicate with the radio LAN access point 101, and can obtain information from the GPS satellite 50x. The terminal 311 obtains information from the GPS satellite 50x and calculates the position information of the terminal 311 itself based on that information. The terminal 311 transmits the position information of itself to the authentication server 400 via the radio LAN access point 101. The terminal 311 immediately replies with the current position information of itself when transmission of position information for itself is requested from the authentication server 400.

As a current position information transmission method for this terminal, it is possible to use a vender unique area in the information frame when connection of a standard radio LAN protocol is started. When position information is set in a predetermined format in this vender unique area, the authentication server executes the later mentioned authentication processing, such as enabling access to a file server, regarding that the terminal at the transmission source has a function corresponding to the authentication technology according to the present embodiment. When the position information is not set, the terminal can execute such processing as accessing only general public data with the lowest security level as a general terminal. By this, the authentication functions of the present embodiment can be implemented without damaging the universality of the currently used radio LAN protocol.

The flow chart in FIG. 7 shows an example of operation of such a terminal 3xx. At first, operation for obtaining the current position information of the terminal 3xx itself from GPS (step 921) is repeated until the current position enters the communicable area of the nearest radio LAN access point (step 922), and when the current position enters the communicable area, the terminal 3xx transmits, to the authentication server 400, the current position information of the terminal 3xx and position information of the currently connected radio LAN access point (network segment) via the radio LAN access point to request access (step 923). The terminal 3xx then waits for the access enable signal (step 924) and, if access is enabled (step 925), access is requested to the file server (step 926) and data is obtained (step 927). If access is disabled, access to the file server is not executed (step 928).

When the position information of the received terminal 311 is within the access enabled range of the information table 600 in FIG. 2, the authentication server 400 adds the terminal 311 to the access origination terminal list 600e.

To the terminal registered in the access origination terminal list 600e, the terminal 311 requests the position information of that terminal at a constant interval, and if the position information of the received terminal is outside the access enabled range of the information table 600, or if no replay to the position information is received, the terminal information is deleted from the access origination terminal list 600e.

When the terminal 311 attempts to obtain information from the file server, the terminal 311 inquires the authentication server 400 about the terminals which are allowed access to the area 211 where the terminal 311 is positioned.

Referring to the information table 600, where information of the terminal 311 is in the access origination terminal list 600e indicated by the row 601 corresponding to the area 211, the authentication server 400 allows the terminal 311 to access the file server 411 which is registered in the access origination terminal list 600d corresponding to the area 211. As a result of referring to the information table 600, if the information on the terminal 311 does not exist in the access origination terminals indicated by the row 601 corresponding to the area 211, the access is not approved, regarding that the terminal 311 is already outside the area 211. By this, the terminal 311 can obtain information from the file server 411 via the radio LAN access point 101 and the network as long as the terminal 311 is in the area 211.

The same procedure can be used for other terminals. As shown in FIG. 2, the terminal 312 in the area 212 can access the file server 412. The terminals 313 and 314 in the area 213 can access the file server 413 and the terminal 300. The terminal 315 in the area 214, which is connected to the network via another radio LAN access point 102, is in range to access the terminal 312 and the terminal 301, but can access only the terminal 312, since the terminal 301 is not connected to the network.

The terminal 301 in the area 200, which cannot communicate with any radio LAN access point, cannot connect to the authentication server 400. When the terminal 301 enters the communication enabled range of the radio LAN access point 101 or 102, then the terminal 301 succeeds in connection to the authentication server, and can communicate according to the access setting of the area.

Figure 6:
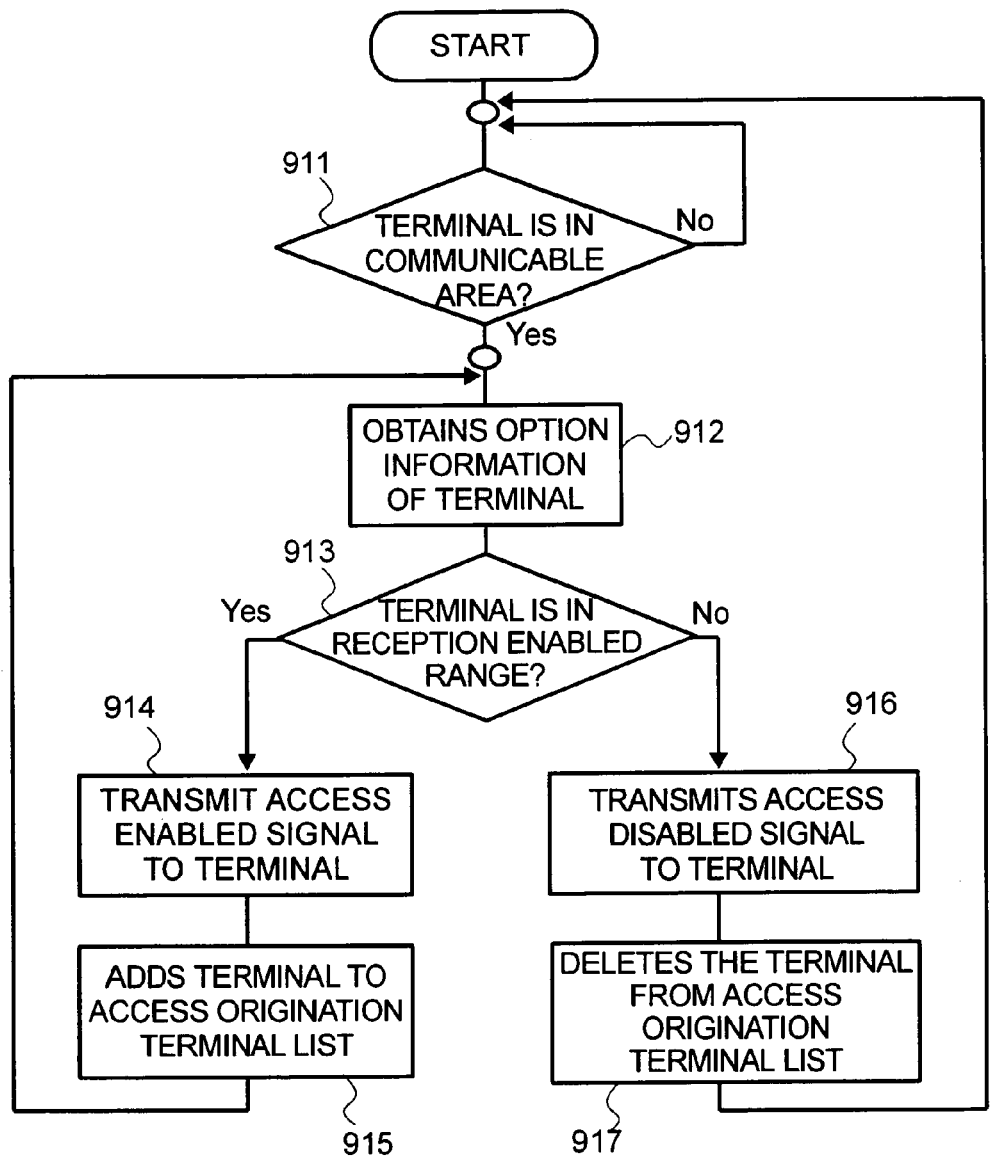
FIG. 6 is a flow chart depicting an example of the operation of the authentication server in the information network system according to an embodiment of the present invention.

An example of operation of the above mentioned authentication server will now be described with reference to the flow chart in FIG. 6.

The authentication server monitors whether an arbitrary terminal 3xx is in the communicable range of an arbitrary radio LAN access point (step 911), and if it is in the communicable range, the authentication server obtains the current position information of this terminal from this terminal (step 912), checks whether the current position of this terminal is within the reception enabled range which is set for each radio LAN access point (step 913), and if it is within the reception enabled range, the authentication server transmits the access enabled signal to this terminal (step 914), and adds this terminal to the access origination terminal list of the information table 600 (step 915). If the terminal 3xx is outside the range in step 913, the authentication server notifies access disabled to this terminal (step 916) and deletes this terminal from the access origination terminal list (step 917).

Figure 5:
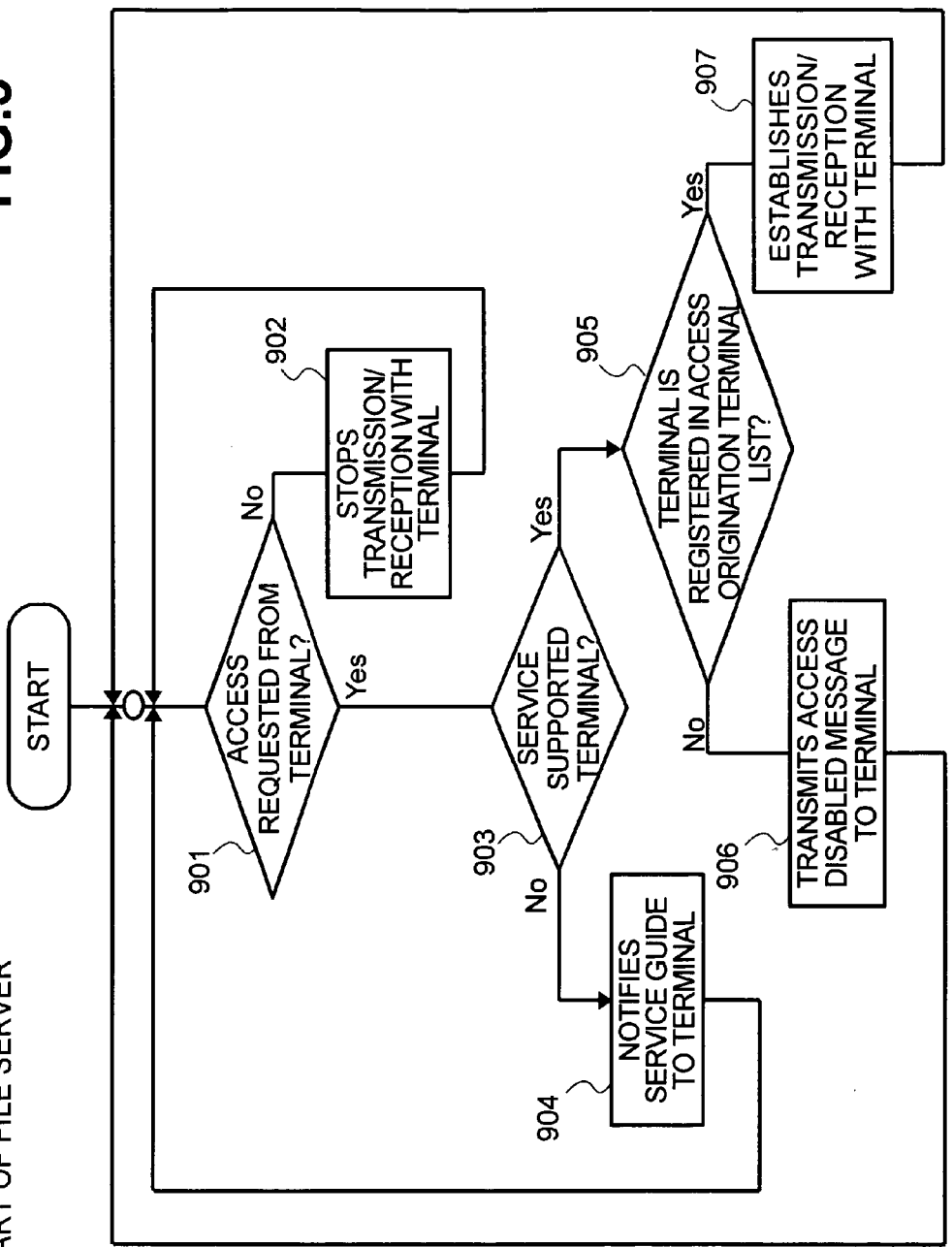
FIG. 5 is a flow chart depicting an example of the operation of the file server in the information network system according to an embodiment of the present invention.

An example of operation of the file server will now be described with reference to FIG. 5. The file server monitors the access request from an arbitrary terminal (step 901), and if access is not requested, transmission/reception with this terminal is stopped (step 902). If access is requested, the file server judges whether the terminal is supported with such an information distribution service as the multimedia information of this file server (step 903), and if the terminal is not supported, the file server notifies the service guide (step 904). If the terminal is supported with the service, the file server checks whether this terminal is registered in the access origination terminal list (step 905), and if it is registered (that is, authenticated), the file server establishes transmission/reception with this terminal (step 907). If this terminal is not registered, the file server sends an access disabled message to this terminal (step 906).

If the radio LAN access points 101 and 102 have areas which cover different floors in the same building, the authentication server 400 cannot know which floor where the terminal exists merely by the position information obtained from the GPS satellite. To solve this technical problem, the present embodiment records the radio LAN access point (network segment) used by the terminal (first position information) as well in advance, and uses this information for authentication along with the current position of the terminal (second position information), so the difference in height direction can be considered. This uses the fact that radio waves used for a radio LAN do not pass through the walls of buildings.

Figure 3:
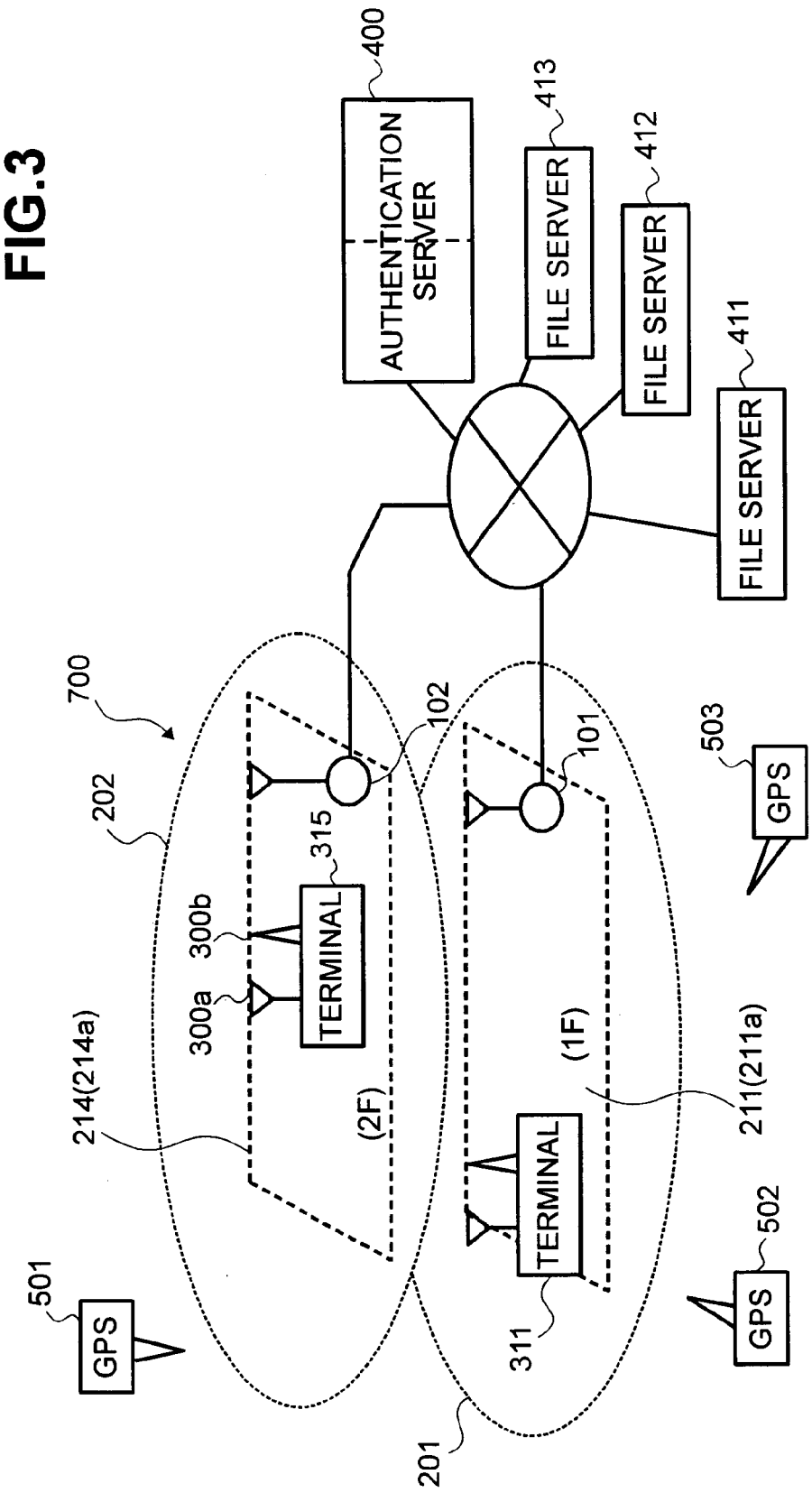
FIG. 3 is a simplified schematic diagram depicting a variant form of the configuration of the information network system for embodying the control method for the information network system according to an embodiment of the present invention.

As FIG. 3 shows, the radio LAN access points 101 and 102 are installed on the first floor 211a (1F) and second floor 214a (2F) of the two storey building 700 respectively, the area 211 is set to the floor range of the first floor 211a as the access enabled area of the terminal to the radio LAN access point 101, and in the same way, the area 214 is set to the floor range of the second floor 214a as the access enabled area of the terminal to the radio LAN access point 102. And the authentication server 400 uses the position information of the radio LAN access points 101 and 102, in addition to the current position information of individual terminals 311 and 315, for authentication to decide accessibility to data of the file server 41x, so that individual terminals 311 and 315 positioned on each floor can be identified accurately, and appropriate data access control becomes possible.

The advantage of this method is that communication for sharing a file with a terminal outside the specified range can be blocked even if the terminal is within the range of communicable areas 201 and 202 of the radio LAN access points 101 and 102, and it is unnecessary to provide the terminal side with a special mechanism for this system. Therefore this system can be used for eliminating invalid terminals.

In other words, even if the radio waves of the radio LAN leaks from the building 700, and a terminal positioned outside the building 700 can connect to the radio LAN, the current position information of the terminal is judged to be outside the access enabled area, so authentication fails and the security of data access can be maintained.

Figure 4:
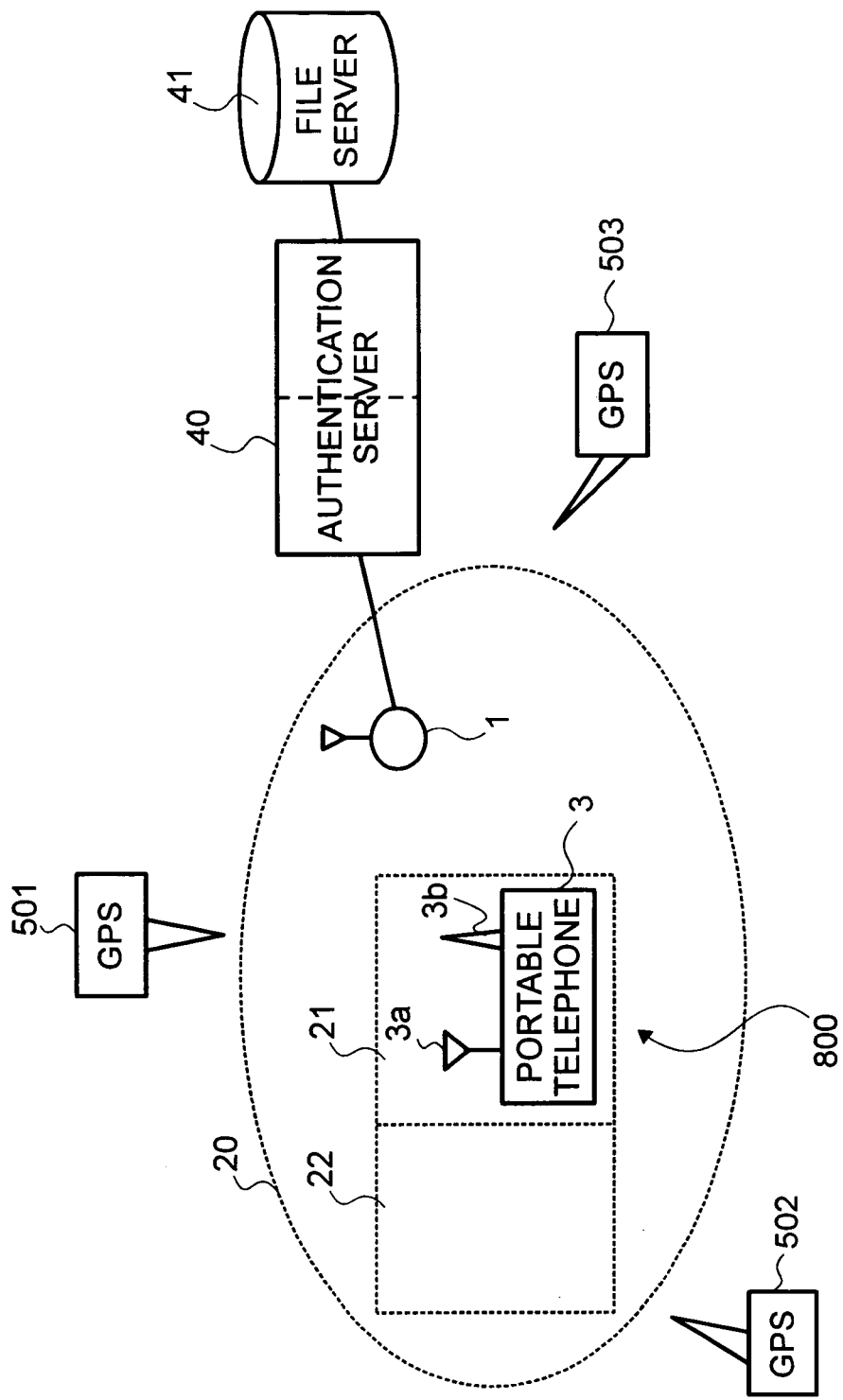
FIG. 4 is a simplified schematic diagram depicting an application example of the information network system for embodying the control method for the information network system according to an embodiment of the present invention.

By applying the authentication method of the above mentioned embodiment, this system can be applied to operating the CD shop shown in FIG. 4, for example. In the CD shop 800, an area is decided for each music category, where the area 21 is an area where rock CDs are displayed, and the area 22 is an area where jazz CDs are displayed. The music file for trial listening, corresponding to each area, is stored in the file server 41. The area 21 and area 22 correspond to rock music and jazz music trial listening data respectively by the authentication server 40.

If a customer, who has a portable telephone 3 comprised of the radio LAN access function 3a to the radio LAN access point 1 which includes the CD shop in the communicable range 20 and GPS reception function 3b from the GPS satellite 50x, is walking in the CD shop and attempts to listen to music data operating the portable telephone 3 in the area 21, the authentication server 40 sends the rock music trial listening data to the portable telephone 3 based on the current position information of the portable telephone 3, and by this, the rock music trial listening data is displayed on the screen of the portable telephone 3, and the data can be listened to. In the same way, if the portable telephone 3 leaves the area and enters the area 22, rock music cannot be listened to, but instead jazz music can.

If the area 21 and area 22 are on different floors of the same building, similar switching and authentication can be performed by using the position information of the radio LAN access point as well, as mentioned above. By using this method, the trial listening data can be provided only to the portable telephone 3 located in a specified range, and invalid use of trial listening data from outside the range can be prevented.

Various other application methods are possible, such as ways of preventing a leak of in-house information to outside an office.

As described above, according to the present embodiment, in an environment where a plurality of terminals 3xx and file servers 41x, which have a sharable file are network-connected via cable or radio, the authentication server 400 controls the sharing of the file based on the position information of each terminal and file server 41x, so access control to the file on the network becomes possible, which is effective to prevent invalid access, and access from a disguised user.

In each terminal 3xx and file server 41x, the position information of each terminal or file server itself is obtained from the distance between the terminal or file server itself and a plurality of GPS satellites 50x or a plurality of portable telephone base stations, and for this, only a GPS receiver or portable telephone receiver is installed to the terminal 3xx and file server 41x, and GPS satellites or portable telephone base stations have already been organized, so without adding a major investment to the current equipment, invalid access and access from a disguised user can be effectively prevented.

Also the authentication server 400 decides the communication possible range of each terminal and file server and controls the communication range, from the position information received from each terminal 3xx and file server 41x, so communication is enabled only for access based on correct position information, so invalid access and access from a disguised user can be effectively prevented.

The present invention provides a file access authentication method characterized in that in an environment where a plurality of terminals and file servers, which have sharable files, are network-connected via cable or radio, an authentication server controls the sharing of the file based on the position information of the respective terminal and file server. In some embodiments, the position information of the terminal or file server itself is obtained from the distance between the terminal or file server itself and a plurality of GPS satellites or a plurality of portable telephone base stations. In specific embodiments, the communicable range of each terminal and file server is decided, and the communication range is controlled from the position information received from each terminal and file server.

One aspect of the invention provides a network connection environment only within a limited range by limiting the communicable range and rejecting a network connection from an unexpected terminal appropriately, and an appropriate information transfer can be enabled while preventing a leak of information and preventing access from a disguised user.

Another aspect of the invention is that in each terminal and file server, the position information of the terminal or file server itself is obtained from the distance between the terminal or file server itself and a plurality of GPS satellites or a plurality of portable telephone base stations, and the information can be applied to security management.

Yet another aspect is that in the authentication server, the communicable range of each terminal and file server can be determined and the communication range can be controlled from the position information received from each terminal and file server.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A method of providing access to an information unit by a wireless unit, the method comprising:

providing a first position information containing an access enabled area for the wireless unit, the access enabled area falling within a range of communicable area of a wireless access point;

obtaining a second position information containing a current position of the wireless unit;

if the current position of the wireless unit is within the access enabled area for the wireless unit according to the first and second position information, then permitting access to the information unit by the wireless unit; and if the current position of the wireless unit is outside the access enabled area for the wireless unit according to the first and second position information, then denying access to the information unit by the wireless unit even if the current position of the wireless unit is within the range of communicable area of the access point;

wherein the first position information contains a plurality of access enabled areas which fall within the range of communicable area of one or more wireless access points, and wherein if the current position of the wireless unit is within one of the access enabled areas, then permitting access to the information unit by the wireless unit; and wherein the first position information contains a first access enabled area which falls within the range of communicable area of a first wireless access point, the first position information including a GPS position of the first access enabled area and a height of the first wireless access point; wherein the second position information includes as the current position of the wireless unit a GPS position information of the wireless unit and a height of the wireless access point through which the wireless unit is evaluated for access to an information unit; and wherein the current position of the wireless unit is within the first access enabled area of the wireless unit if the current position is within the first access enabled area in both the GPS position information and the height.

2. The method of claim 1 wherein if the current position of the wireless unit is within one of the access enabled areas, a same scope of access to the information unit by the wireless unit is permitted without regard to which of the access enabled areas within which the current position of the wireless unit is.

3. The method of claim 1 wherein the second position information is obtained from the wireless unit.

4. The method of claim 1 wherein the wireless access point is a radio LAN access point.

5. The method of claim 1 wherein permitting access comprises adding the wireless unit to an access origination unit list.

6. The method of claim 5 further comprising periodically obtaining the second position information and, if the current position of the wireless unit is outside the access enabled area for the wireless unit, then removing the wireless unit from the access origination unit list.

7. The method of claim 1 further comprising monitoring the second position information of the wireless unit and, if the current position of the wireless unit is outside the access enabled area for the wireless unit, then denying access the information unit by the wireless unit.

8. A system for providing access to an information unit by a wireless unit, the system comprising:

a memory including a first position information containing an access enabled area for the wireless unit, the access enabled area falling within a range of communicable area of a wireless access point;

a position module configured to obtain a second position information containing a current position of the wireless unit; and an access module configured, if the current position of the wireless unit is within the access enabled area for the wireless unit according to the first and second position information, to permit access to the information unit by the wireless unit, and, if the current position of the wireless unit is outside the access enabled area for the wireless unit according to the first and second position information, to deny access to the information unit by the wireless unit even if the current position of the wireless unit is within the range of communicable area of the access point;

wherein the first position information contains a plurality of access enabled areas which fall within the range of communicable area of one or more wireless access points, and wherein if the current position of the wireless unit is within one of the access enabled areas, then permitting access to the information unit by the wireless unit; and wherein the first position information contains a first access enabled area which falls within the range of communicable area of a first wireless access point, the first position information including a GPS position of the first access enabled area and a height of the first wireless access point; wherein the second position information includes as the current position of the wireless unit a GPS position information of the wireless unit and a height of the wireless access point through which the wireless unit is evaluated for access to an information unit; and wherein the current position of the wireless unit is within the first access enabled area of the wireless unit if the current position is within the first access enabled area in both the GPS position information and the height.

9. The system of claim 8 wherein the access module is configured, if the current position of the wireless unit is within one of the access enabled areas, to permit a same scope of access to the information unit by the wireless unit without regard to which of the access enabled areas within which the current position of the wireless unit is.

10. The system of claim 8 wherein the wireless access point is a radio LAN access point.

11. The system of claim 8 wherein the access module is configured, if the current position of the wireless unit is within one of the access enabled areas, to permit access to the information unit by the wireless unit by adding the wireless unit to an access origination unit list in the memory.

12. The system of claim 11 wherein the access module is configured to periodically obtain the second position information and, if the current position of the wireless unit is outside the access enabled area for the wireless unit, to remove the wireless unit from the access origination unit list.

13. The system of claim 8 wherein the access module is configured to monitor the second position information of the wireless unit and, if the current position of the wireless unit is outside the access enabled area for the wireless unit, to deny access the information unit by the wireless unit.

14. A computer readable medium storing a program used for providing access to an information unit by a wireless unit, the program comprising:

code for providing a first position information containing an access enabled area for the wireless unit, the access enabled area falling within a range of communicable area of a wireless access point;

code for obtaining a second position information containing a current position of the wireless unit;

code for, if the current position of the wireless unit is within the access enabled area for the wireless unit according to the first and second position information, permitting access to the information unit by the wireless unit; and code for, if the current position of the wireless unit is outside the access enabled area for the wireless unit according to the first and second position information, denying access to the information unit by the wireless unit even if the current position of the wireless unit is within the range of communicable area of the access point;

wherein the first position information contains a plurality of access enabled areas which fall within the range of communicable area of one or more wireless access points, and wherein if the current position of the wireless unit is within one of the access enabled areas, then permitting access to the information unit by the wireless unit; and wherein the first position information contains a first access enabled area which falls within the range of communicable area of a first wireless access point, the first position information including a GPS position of the first access enabled area and a height of the first wireless access point; wherein the second position information includes as the current position of the wireless unit a GPS position information of the wireless unit and a height of the wireless access point through which the wireless unit is evaluated for access to an information unit; and wherein the current position of the wireless unit is within the first access enabled area of the wireless unit if the current position is within the first access enabled area in both the GPS position information and the height.

15. The medium of claim 14 wherein the code for permitting access comprises code for, if the current position of the wireless unit is within one of the access enabled areas, permitting a same scope of access to the information unit by the wireless unit is permitted without regard to which of the access enabled areas within which the current position of the wireless unit is.

16. The medium of claim 14 wherein the code for permitting access comprises code for adding the wireless unit to an access origination unit list.

17. The medium of claim 16 further comprising code for periodically obtaining the second position information and, if the current position of the wireless unit is outside the access enabled area for the wireless unit, then removing the wireless unit from the access origination unit list.

18. The medium of claim 14 further comprising code for monitoring the second position information of the wireless unit and, if the current position of the wireless unit is outside the access enabled area for the wireless unit, then denying access the information unit by the wireless unit.

19. A method of providing access to an information unit by a wireless unit, the method comprising:

providing a first position information containing an access enabled area for the wireless unit;

obtaining a second position information containing a current position of the wireless unit;

if the current position of the wireless unit is within the access enabled area for the wireless unit according to the first and second position information, then permitting access to the information unit by the wireless unit; and if the current position of the wireless unit is outside the access enabled area for the wireless unit according to the first and second position information, then denying access to the information unit by the wireless unit even if the current position of the wireless unit is within the range of communicable area of the access point;

wherein the first position information contains a plurality of access enabled areas which fall within the range of communicable area of one or more wireless access points, and wherein if the current position of the wireless unit is within one of the access enabled areas, then permitting access to the information unit by the wireless unit; and wherein the first position information contains a first access enabled area which falls within the range of communicable area of a first wireless access point, the first position information including a GPS position of the first access enabled area and a height of the first wireless access point; wherein the second position information includes as the current position of the wireless unit a GPS position information of the wireless unit and a height of the wireless access point through which the wireless unit is evaluated for access to an information unit; and wherein the current position of the wireless unit is within the first access enabled area of the wireless unit if the current position is within the first access enabled area in both the GPS position information and the height.

* * * * *